United States Patent
Kim et al.

(10) Patent No.: US 12,518,923 B2
(45) Date of Patent: Jan. 6, 2026

(54) MULTILAYER CERAMIC CAPACITOR AND METHOD OF MANUFACTURING THE SAME

(71) Applicant: SAMSUNG ELECTRO-MECHANICS CO., LTD., Suwon-si (KR)

(72) Inventors: Minsoo Kim, Suwon-si (KR); Seung Yong Lee, Suwon-si (KR); Yonghwa Lee, Suwon-si (KR); Sang Jin Park, Suwon-si (KR); Jinbok Shin, Suwon-si (KR); Youngjoon Oh, Suwon-si (KR); Hyunsik Chae, Suwon-si (KR); Jihyeon Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 234 days.

(21) Appl. No.: 18/535,394

(22) Filed: Dec. 11, 2023

(65) Prior Publication Data
US 2025/0095919 A1   Mar. 20, 2025

(30) Foreign Application Priority Data
Sep. 15, 2023   (KR) ................. 10-2023-0123104

(51) Int. Cl.
*H01G 4/12* (2006.01)
*H01G 4/30* (2006.01)

(52) U.S. Cl.
CPC .......... *H01G 4/1227* (2013.01); *H01G 4/306* (2013.01)

(58) Field of Classification Search
CPC ...... H01G 4/1227; H01G 4/306; H01G 4/012; H01G 4/30; H01G 4/1281; H01G 13/00
See application file for complete search history.

(56) References Cited

U.S. PATENT DOCUMENTS

| | | | |
|---|---|---|---|
| 2012/0250216 A1 | 10/2012 | Ishii et al. | |
| 2020/0243262 A1* | 7/2020 | Kwak | H01G 4/228 |
| 2022/0177371 A1* | 6/2022 | Chung | H01G 4/248 |
| 2025/0095919 A1* | 3/2025 | Kim | H01G 4/30 |
| 2025/0140482 A1* | 5/2025 | Lee | C04B 35/4682 |

FOREIGN PATENT DOCUMENTS

| | | | | |
|---|---|---|---|---|
| DE | 102012205101 A1 * | 10/2012 | | H01G 4/1227 |
| JP | 2001506425 A * | 5/2001 | | H01G 4/1227 |
| KR | 10-2008-0061302 A | 7/2008 | | |
| KR | 10-2012-0112173 A | 10/2012 | | |
| KR | 10-2020-0093986 A | 8/2020 | | |
| KR | 20200133410 A * | 11/2020 | | H01G 4/10 |

* cited by examiner

*Primary Examiner* — Dion R. Ferguson
(74) *Attorney, Agent, or Firm* — Morgan Lewis & Bockius LLP

(57) ABSTRACT

Provided is a multilayer ceramic capacitor and a method of manufacturing the same. The multilayer ceramic capacitor includes a capacitor body including a dielectric layer and an internal electrode layer, and an external electrode disposed outside the capacitor body. The dielectric layer includes barium titanate-based main ingredient including barium (Ba) and titanium (Ti), and gallium (Ga)Peak intensity ratio of Ba/Ga (IBa/IGa), obtained by TEM-EDS analysis of a region from an interface between the dielectric layer and the internal electrode layer to a depth surface of 10 nm to 500 nm into the dielectric layer, is 1.0 to 5.0.

20 Claims, 10 Drawing Sheets

FIG. 8

|  | Comparative Example 2 | Example 1 | Example 2 |
|---|---|---|---|
| Ga content (parts by mole) | 0 | 0.3 | 0.6 |
| Internal electrode connectivity (%) | 76 | 85 | 89 |
| Image of active portion | | | |

FIG. 9

|  | Comparative Example 2 | Example 1 | Example 2 |
|---|---|---|---|
| Ga content (parts by mole) | 0 | 0.3 | 0.6 |
| Internal electrode connectivity (%) | 77 | 82 | 86 |
| Image of region near side margin portion | | | |

MULTILAYER CERAMIC CAPACITOR AND METHOD OF MANUFACTURING THE SAME

CROSS-REFERENCE TO RELATED APPLICATION

This application claims priority to and the benefit of Korean Patent Application No. 10-2023-0123104 filed in the Korean Intellectual Property Office on Sep. 15, 2023, the entire contents of which are incorporated herein by reference.

TECHNICAL FIELD

This disclosure relates to a multilayer ceramic capacitor and a method of manufacturing the same.

BACKGROUND

As electronic components using a ceramic material, there are a capacitor, an inductor, a piezoelectric element, a varistor, a thermistor, and the like. Among ceramic electronic components, a multilayer ceramic capacitor (MLCC) may be used in various electronic devices due to advantages such as a small size, a high capacitance, an easy mounting feature, and the like.

For example, a multilayer ceramic capacitor may be used in a chip type condenser mounted on a board of several electronic products such as image devices, for example, liquid crystal displays (LCD), plasma display panels (PDP), or the like, computers, personal portable terminals, smartphones, and the like, to serve to charge or discharge electricity therein or therefrom.

Recently, with the trend of miniaturization and thin-filmization of multilayer ceramic capacitors, short defects commonly occur due to the reduction in thickness of the dielectric and internal electrodes.

SUMMARY

An embodiment provides a multilayer ceramic capacitor with improved internal electrode connectivity by alleviating sintering mismatching between a dielectric layer and an internal electrode layer.

Another embodiment provides a method of manufacturing the multilayer ceramic capacitor.

An embodiment provides a multilayer ceramic capacitor, including: a capacitor body including a dielectric layer and an internal electrode layer, and an external electrode disposed outside the capacitor body. The dielectric layer includes a barium titanate-based main ingredient including barium (Ba) and titanium (Ti), and gallium (Ga). Peak intensity ratio of Ba/Ga ($I_{Ba}/I_{Ga}$), obtained by TEM-EDS analysis of a region from an interface between the dielectric layer and the internal electrode layer to a depth surface of 10 nm to 500 nm into the dielectric layer, is 1.0 to 5.0.

Peak intensity ratio of Ti/Ga ($I_{Ti}/I_{Ga}$), obtained by the TEM-EDS analysis of the region, may be 1.0 to 5.0.

The dielectric layer may further include an accessory ingredient, and the accessory ingredient may include aluminum (Al), silicon (Si), magnesium (Mg), vanadium (V), manganese (Mn), or a combination thereof.

The accessory ingredient may include the aluminum (Al), and peak intensity ratio of Al/Ga ($I_{Al}/I_{Ga}$), obtained by the TEM-EDS analysis of the region, may be 1.0 to 5.0.

The accessory ingredient may include the silicon (Si), and peak intensity ratio of Si/Ga ($I_{Si}/I_{Ga}$), obtained by the TEM-EDS analysis of the region, may be 1.0 to 5.0.

The accessory ingredient may include the magnesium (Mg), and peak intensity ratio of Mg/Ga ($I_{Mg}/I_{Ga}$), obtained by the TEM-EDS analysis of the region, may be 0.4 to 2.0.

The gallium (Ga) may exist as a second phase in combination with the accessory ingredient.

The gallium (Ga) may be included in an amount of 0.01 parts by mole to 10 parts by mole based on 100 parts by mole of the barium titanate-based main ingredient.

The dielectric layer may include a plurality of grains and a grain boundary positioned between the adjacent grains, and the gallium (Ga) may exist at the grain boundary.

The molar ratio of gallium (Ga) existing in the grain boundary and gallium (Ga) existing in the grain may be 5:1 to 50:1.

The gallium (Ga) may be formed from a gallium (Ga) complex.

The capacitor body may be formed by sintering at a temperature of 1000° C. to 1200° C.

The capacitor body has an active portion in which the dielectric layer and the internal electrode layer are alternately arranged, and the internal electrode connectivity defined by Equation 1 below in the active portion may be 80% or more to 100% or less.

Internal electrode connectivity(%)=(total length of connection portions excluding disconnection portions in the plurality of internal electrode layers/total length of the plurality of internal electrode layers)×100   (Equation 1)

The capacitor body further has side margin portions disposed on both side ends of the active portion facing each other, and the internal electrode connectivity defined by Equation 1 in a region near side margin portion, which is defined as a region from a boundary between the active portion and the side margin portion to a depth surface corresponding to a point of 5% to 20% of the total length of the active portion into the active portion, may be 80% or more to 100% or less.

Another embodiment provides a method of manufacturing a multilayer ceramic capacitor, including: preparing a dielectric slurry by mixing barium titanate-based main ingredient powder and gallium (Ga) complex; preparing a dielectric green sheet using the dielectric slurry and forming a conductive paste layer on the surface of the dielectric green sheet; preparing a dielectric green sheet stacking structure by stacking the dielectric green sheet on which the conductive paste layer is formed; preparing a capacitor body including a dielectric layer and an internal electrode layer by sintering the dielectric green sheet stacking structure; and forming an external electrode on one surface of the capacitor body. The dielectric layer includes barium titanate-based main ingredient including barium (Ba) and titanium (Ti), and gallium (Ga). Peak intensity ratio of Ba/Ga ($I_{Ba}/I_{Ga}$), obtained by TEM-EDS analysis of a region from an interface between the dielectric layer and the internal electrode layer to a depth surface of 10 nm to 500 nm into the dielectric layer, is 1.0 to 5.0.

The gallium (Ga) complex may include gallium carboxylate in ionic form.

The gallium (Ga) complex may be mixed in an amount of 0.01 parts by mole to 10 parts by mole based on 100 parts by mole of the barium titanate-based main ingredient powder.

The dielectric slurry may be prepared by further mixing accessory ingredient powder including aluminum oxide ($Al_2O_3$), silicon dioxide ($SiO_2$), magnesium oxide (MgO), vanadium oxide ($V_2O_5$), manganese oxide ($MnO_2$), or a combination thereof.

Based on 100 parts by mole of the barium titanate-based main ingredient powder, the aluminum oxide ($Al_2O_3$) may be mixed in an amount of 0.01 parts by mole to 5 parts by mole, the silicon dioxide ($SiO_2$) may be mixed in an amount of 0.01 parts by mole to 5 parts by mole, the magnesium oxide (MgO) may be mixed in an amount of 0.01 parts by mole to 5 parts by mole, the vanadium oxide ($V_2O_5$) may be mixed in an amount of 0.01 parts by mole to 5 parts by mole, and the manganese oxide ($MnO_2$) may be mixed in an amount of 0.01 parts by mole to 5 parts by mole.

The sintering may be performed at a temperature of 1000° C. to 1200° C.

The multilayer ceramic capacitor according to an embodiment is capable of alleviating sintering mismatching between the dielectric layer and the internal electrode layer, thereby minimizing electrode breakage and improving internal electrode connectivity, and thus has high reliability without short circuit.

BRIEF DESCRIPTION OF THE DRAWINGS

FIG. 8 is an SEM image of the active portion of the multilayer ceramic capacitor according to Examples 1 and 2 and Comparative Example 2.

FIG. 9 is an SEM image of the region near side margin portion of the multilayer ceramic capacitor according to Examples 1 and 2 and Comparative Example 2.

DETAILED DESCRIPTION OF THE EMBODIMENTS

Figure 1:
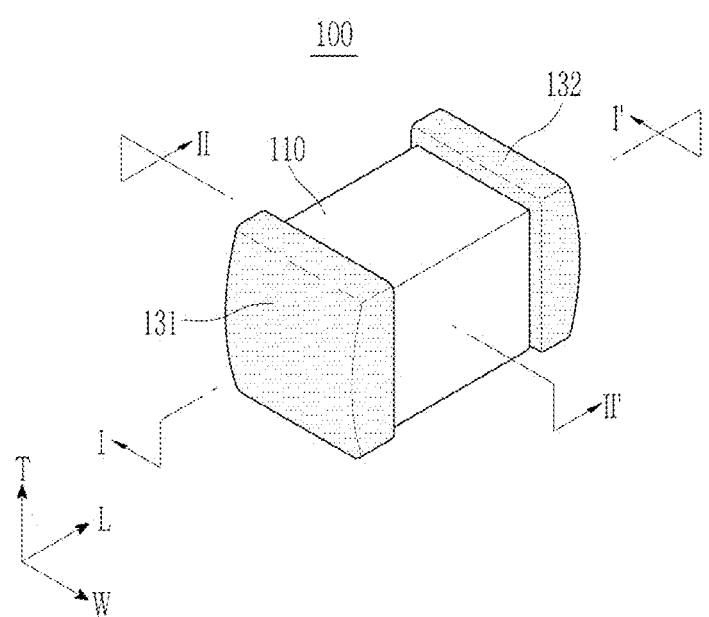
FIG. 1 is a perspective view illustrating a multilayer ceramic capacitor according to an embodiment.

Hereinafter, the present disclosure will be described in detail hereinafter with reference to the accompanying drawings, in which embodiments of the present disclosure are shown. The drawings and description are to be regarded as illustrative in nature and not restrictive. Like reference numerals designate like elements throughout the specification. In the accompanying drawings, some constituent elements are exaggerated, omitted, or schematically illustrated, and the size of each constituent element does not entirely reflect the actual size.

The accompanying drawings are intended only to facilitate an understanding of the exemplary embodiments disclosed in this specification, and it is to be understood that the technical ideas disclosed herein are not limited by the accompanying drawings and include all modifications, equivalents, or substitutions that are within the range of the ideas and technology of the present disclosure.

Although terms of "first," "second," and the like are used to explain various constituent elements, the constituent elements are not limited to such terms. These terms are only used to distinguish one constituent element from another constituent element.

In addition, it will be understood that when an element such as a layer, film, region, or substrate is referred to as being "on" another element, it can be directly on the other element or intervening elements may also be present. In contrast, when an element is referred to as being "directly on" another element, there are no intervening elements present. Further, when an element is referred to as being "on" or "above" a reference element, it can be positioned above or below the reference element, and it is not necessarily referred to as being positioned "on" or "above" in a direction opposite to gravity.

Throughout the specification, the terms "comprise" or "have" are intended to specify the presence of stated features, integers, steps, operations, constituent elements, components or a combination thereof, but do not preclude the presence or addition of one or more other features, integers, steps, operations, constituent elements, components, and/or groups thereof. Therefore, unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Throughout the specification, the term "connected" does not mean only that two or more constituent components are directly connected, but may also mean that two or more constituent components are indirectly connected through another constituent component, that two or more components are electrically connected as well as physically connected, or that two or more constituent components are referred to by different names but are united by location or function.

Hereinafter, a multilayer ceramic capacitor according to an embodiment will be described with reference to FIGS. 1 to 4.

Figure 2:
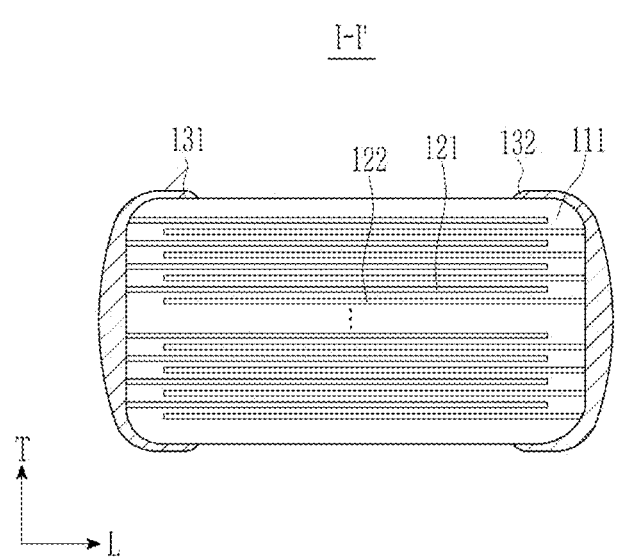
FIG. 2 is a cross-sectional view of a multilayer ceramic capacitor taken along I-I' line of FIG. 1.
Figure 3:
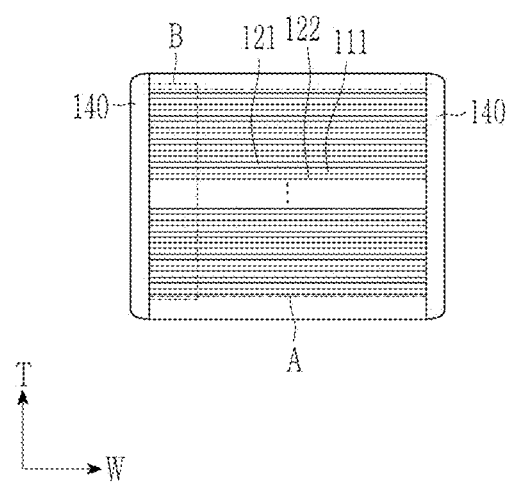
FIG. 3 is a cross-sectional view of the multilayer ceramic capacitor taken along II-II' line of FIG. 1.
Figure 4:
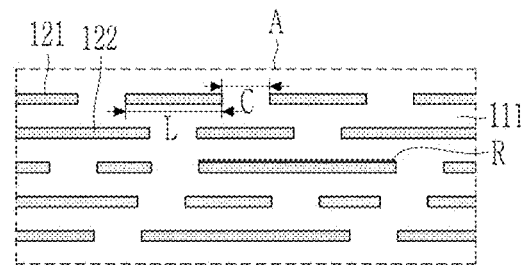
FIG. 4 is an enlarged view of A region of FIG. 3.

FIG. 1 is a perspective view illustrating a multilayer ceramic capacitor according to an embodiment, FIG. 2 is a cross-sectional view of a multilayer ceramic capacitor taken along I-I' line of FIG. 1, FIG. 3 is a cross-sectional view of the multilayer ceramic capacitor taken along II-II' line of FIG. 1, and FIG. 4 is an enlarged view of A region of FIG. 3.

The L-axis, W-axis, and T-axis shown in FIGS. 1 to 3 represent the longitudinal direction, width direction, and thickness direction of a capacitor body 110, respectively. Here, the thickness direction (T-axis direction) may be a direction perpendicular to the wide surface (main surface) of the sheet-shaped components, and may be used as the same concept as a stacking direction in which a dielectric layer 111 are stacked, for example. The longitudinal direction (L-axis direction) may be a direction extending parallel to the wide surface (main surface) of the sheet-shaped components, and may be approximately perpendicular to the thickness direction (T-axis direction). For example, the longitudinal direction (L-axis direction) may be the direction in which a first external electrode 131 and a second external electrode 132 are positioned on both sides. The width direction (W-axis direction) may be a direction extending parallel to the wide surface (main surface) of the sheet-shaped components, and may be approximately perpendicular to the thickness direction (T-axis direction) and the longitudinal direction (L-axis direction). The length of the sheet-shaped components in the longitudinal direction (L-axis direction) may be longer than the length in the width direction (W-axis direction).

Referring to FIGS. 1 to 4, a multilayer ceramic capacitor 100 according to an embodiment includes the capacitor body 110 and external electrodes 131 and 132 disposed outside the capacitor body 110. The external electrodes 131 and 132 may include a first external electrode 131 and a second external electrode 132 disposed at opposite ends of the capacitor body 110 in the longitudinal direction (L-axis direction).

For example, the capacitor body 110 may have a roughly hexahedral shape.

For convenience of description of an embodiment, the two surfaces opposing each other in the thickness direction (T-axis direction) of the capacitor body 110 are referred to as first and second surfaces, the two surfaces connected to the first and second surfaces and opposing each other in the longitudinal direction (L-axis direction) are referred to as third and fourth surfaces, and two surfaces connected to the first and second surfaces and to the third and fourth surfaces, and opposing each other in the width direction (W-axis direction) are referred to as fifth and sixth surfaces.

As an example, the first surface, which is the lower surface, may be a surface facing the mounting direction. Additionally, the first to sixth surfaces may be flat, but the embodiment is not limited thereto. For example, the first to sixth surfaces may be curved surfaces with a convex central portion, and the edges, which are the boundaries of each surface, may be rounded.

The shape and size of the capacitor body 110 and the number of stacks of the dielectric layers 111 are not limited to those shown in the drawings of the embodiment.

The capacitor body 110 includes a plurality of dielectric layers 111 and internal electrode layers 121 and 122. Specifically, the capacitor body 110 includes the plurality of dielectric layers 111, a first internal electrode 121 and a second internal electrode 122 alternately arranged in the thickness direction (T-axis direction) with the plurality of dielectric layers 111 interposed therebetween.

At this time, the boundaries between adjacent dielectric layers 111 of the capacitor body 110 may be integrated to the extent that it is difficult to check without using a scanning electron microscope (SEM).

The capacitor body 110 may have an active portion A. The active portion A is a region where the dielectric layer 111 and the internal electrode layers 121 and 122 are alternately arranged, and is a portion that contributes to forming the capacitance of the multilayer ceramic capacitor 100. Specifically, the active portion A may be a region where the first internal electrode 121 or the second internal electrode 122 stacked along the thickness direction (T-axis direction) overlap.

Additionally, the capacitor body 110 may further include a cover portion and a side margin portion 140.

The cover portion is a thickness direction margin portion, and may be positioned on the first and second surfaces of the active portion A in the thickness direction (T-axis direction), respectively.

The side margin portion 140 may be seen as a side cover portion, and may be positioned on both side ends of the active portion A facing each other in the width direction (W-axis direction), that is, on the fifth and sixth surfaces, respectively. When applying a conductive paste layer for the internal electrode layer on the surface of the dielectric green sheet, the side margin portion 140 may be formed by applying the conductive paste layer on only a part of the surface of the dielectric green sheet, and not applying the conductive paste layer on both sides of the surface of the dielectric green sheet, and then stacking the dielectric green sheets and sintering them. However, it is not limited to this formation method.

The cover portion and the side margin portion 140 serve to prevent damage to the first internal electrode 121 and the second internal electrode 122 due to physical or chemical stress.

The dielectric layer 111 according to an embodiment includes barium titanate-based main ingredient including barium (Ba) and titanium (Ti), and gallium (Ga).

The capacitor body 110 may be formed by sintering a stacking structure in which the plurality of dielectric layers 111 and the internal electrode layers 121 and 122 are stacked in the thickness direction (T-axis direction). At this time, as the metal-based internal electrode layers 121 and 122 are sintered at a relatively lower temperature than that of the ceramic dielectric layer 111, the internal electrode layers 121 and 122 may be over-sintered and over-shrunk at the time the dielectric layer 111 is sintered, resulting in breakage.

According to an embodiment, gallium (Ga) may serve as a low-temperature sintering agent that alleviates sintering mismatch between the dielectric layer 111 and the internal electrode layers 121 and 122.

The barium titanate-based main ingredient is a dielectric base material, has a high dielectric constant, and contributes to forming the dielectric constant of the multilayer ceramic capacitor 100.

Gallium (Ga) may be an element that is formed, that is, derived, from a gallium (Ga) complex, which is a material added to the dielectric base material. When gallium (Ga) is formed from a gallium (Ga) complex, gallium (Ga) is stably added to enable uniform distribution at the atomic unit, thereby enhancing the low-temperature sintering effect of the dielectric layer.

Accordingly, by alleviating the sintering mismatch between the dielectric layer and the internal electrode layer, electrode breakage may be minimized and internal electrode connectivity may be improved.

Additionally, gallium (Ga) is a metal element with a low melting point of 29.76° C., and may exist in liquid form at temperatures above 30° C. This can accelerate phenomena such as heat transfer and mass transfer, providing a low-temperature sintering effect of the dielectric layer.

Specifically, when analyzing TEM-EDS (transmission electron microscopy-energy dispersive spectroscopy) in a region positioned near the interface between the dielectric layer 111 and the internal electrode layers 121 and 122, i.e., in a region near interface R, the peak intensity ratio of Ba/Ga ($I_{Ba}/I_{Ga}$) may be 1.0 to 5.0, for example, 1.1 to 3.0, or 1.2 to 2.0. In TEM-EDS analysis, when the peak intensity ratio ($I_{Ba}/I_{Ga}$) is within the above range, sintering mismatch between the dielectric layer and the internal electrode layer may be alleviated, electrode breakage may be minimized, and thus, internal electrode connectivity may be improved. Accordingly, it is possible to secure a multilayer ceramic capacitor with high reliability without causing short circuits.

Here, the region near interface R may be defined as a region starting from the interface between the dielectric layer 111 and the internal electrode layers 121 and 122, and extending to a depth surface of 10 nm to 500 nm from the interface into the dielectric layer 111, for example, to a depth surface of 50 nm to 200 nm.

FIG. 4 is illustrated to help understand the region near interface R, and for convenience, only one region near interface R is shown, but it is not limited to this drawing. In other words, the region near interface R may exist wherever the interface between the dielectric layer 111 and the internal electrode layers 121 and 122 exists, and may exist on the other surface in addition to one surface of one internal electrode layer.

TEM-EDS analysis may be performed in the following method. Specifically, after the multilayer ceramic capacitor 100 is placed in an epoxy mixture and cured, the W-axis and T-axis directional surfaces (WT surfaces) of the capacitor body 110 are polished up to ½ point in the L-axis direction, fixed, and held in a vacuum atmosphere chamber, so that a cross-sectional sample may be obtained to observe the active portion where the dielectric layer 111 and the internal electrode layers 121 and 122 intersect.

Then, the central portion of the active portion of the cross-sectional sample may be measured using a transmission electron microscope (TEM). The TEM may be performed using a Xe—FIB (focused ion beam) under the conditions of an acceleration voltage of 200 kV and an analysis magnification of 110 k times, and may measure to produce at least 1 layer, 3 layers, 5 layers, and 10 layers of dielectric layers 111 and the internal electrode layers 121 and 122.

Subsequently, in the TEM image of the measured cross-sectional sample, the peak intensities of gallium (Ga) and barium (Ba) may be obtained through EDS analysis. The peak intensity ratio of Ba/Ga ($I_{Ba}/I_{Ga}$) is the peak intensity of barium (Ba) divided by the peak intensity of gallium (Ga) shown in TEM-EDS analysis. The peak intensity ratio of Ba/Ga may be an average value measured for the region near interface R at at least one point, two points, three points, or five points in the active portion. For example, if measured for the region near interface R at two points, it may be the average value of the peak intensity ratio of Ba/Ga at each point.

In addition, when TEM-EDS is analyzed in the region near interface R in the same method as described above, the peak intensity ratio of Ti/Ga ($I_{Ti}/I_{Ga}$) may be 1.0 to 5.0, for example, 1.1 to 3.0, or 1.2 to 2.0. In TEM-EDS analysis, when the peak intensity ratio ($I_{Ti}/I_{Ga}$) is within the above range, sintering mismatch between the dielectric layer and the internal electrode layer may be alleviated, electrode breakage may be minimized, and thus, internal electrode connectivity may be improved.

The gallium (Ga) may be included in the dielectric layer 111 in an amount of 0.01 parts by mole to 10 parts by mole, for example, 0.05 parts by mole to 8 parts by mole, or 0.1 parts by mole to 5 parts by mole, based on 100 parts by mole of the barium titanate-based main ingredient. When gallium (Ga) is included within the above content range, the low-temperature sintering effect of the dielectric layer may be increased, and accordingly, sintering mismatch between the dielectric layer and the internal electrode layer may be alleviated, electrode breakage may be minimized, and thus internal electrode connectivity may be improved. Therefore, it is possible to secure a highly reliable multilayer ceramic capacitor without causing short circuits.

The dielectric layer according to an embodiment may further include an accessory ingredient including aluminum (Al), silicon (Si), magnesium (Mg), vanadium (V), manganese (Mn), or a combination thereof. Gallium (Ga) may also exist in a second phase in combination with these accessory ingredients.

The accessory ingredients may be derived from metal oxides added as the accessory ingredient to the dielectric base material.

When TEM-EDS was analyzed in the region positioned near the interface between the dielectric layer 111 and the internal electrode layers 121 and 122, i.e., in the region near interface R in the same method as described above, the peak intensity ratio of Al/Ga ($I_{Al}/I_{Ga}$) may be 1.0 to 5.0, for example, 1.0 to 4.0, or 1.2 to 3.0. In TEM-EDS analysis, when the peak intensity ratio ($I_{Al}/I_{Ga}$) is within the above range, sintering mismatch between the dielectric layer and the internal electrode layer may be alleviated, electrode breakage may be minimized, and thus, internal electrode connectivity may be improved.

In addition, when TEM-EDS was analyzed in the region positioned near the interface between the dielectric layer 111 and the internal electrode layers 121 and 122, i.e., in the region near interface R in the same method as described above, the peak intensity ratio of Si/Ga ($I_{Si}/I_{Ga}$) may be 1.0 to 5.0, for example, 1.0 to 4.0, or 1.5 to 3.0. In TEM-EDS analysis, when the peak intensity ratio ($I_{Si}/I_{Ga}$) is within the above range, sintering mismatch between the dielectric layer and the internal electrode layer may be alleviated, electrode breakage may be minimized, and thus, internal electrode connectivity may be improved.

In addition, when TEM-EDS was analyzed in the region positioned near the interface between the dielectric layer 111 and the internal electrode layers 121 and 122, i.e., in the region near interface R in the same method as described above, the peak intensity ratio of Mg/Ga ($I_{Mg}/I_{Ga}$) may be 0.4 to 2.0, for example, 0.4 to 1.5, or 0.5 to 1.0. In TEM-EDS analysis, when the peak intensity ratio ($I_{Mg}/I_{Ga}$) is within the above range, sintering mismatch between the dielectric layer and the internal electrode layer may be alleviated, electrode breakage may be minimized, and thus, internal electrode connectivity may be improved.

Aluminum (Al), an accessory ingredient, may be included in an amount of 0.01 parts by mole to 5 parts by mole based on 100 parts by mole of the barium titanate-based main ingredient, silicon (Si) may be included in an amount of 0.01 parts by mole to 5 parts by mole based on 100 parts by mole of the barium titanate-based main ingredient, magnesium (Mg) may be included in an amount of 0.01 parts by mole to 5 parts by mole based on 100 parts by mole of the barium titanate-based main ingredient, vanadium (V) may be included in an amount of 0.01 parts by mole to 5 parts by mole based on 100 parts by mole of the barium titanate-based main ingredient, and manganese (Mn) may be included in an amount of 0.01 parts by mole to 5 parts by mole based on 100 parts by mole of the barium-based main ingredient. When each of the accessory ingredient is contained within the above content range, it is easy to form a second phase with gallium (Ga), and accordingly, the low-temperature sintering effect of the dielectric layer may be increased. Therefore, sintering mismatch between the dielectric layer and the internal electrode layer may be alleviated, electrode breakage may be minimized, and thus, internal electrode connectivity may be improved.

The dielectric layer 111 may include a plurality of grains and a grain boundary positioned between adjacent grains.

The grain may include a barium titanate-based main ingredient.

Gallium (Ga) may exist in both a grain and a grain boundary in the dielectric layer 111, for example, at a grain boundary. Additionally, gallium (Ga) may exist in a second phase form at grain boundary. Specifically, the molar ratio of gallium (Ga) existing at the grain boundary and gallium (Ga) existing at the grain may be 5:1 to 50:1, for example, 10:1 to 30:1. When the molar ratio of gallium (Ga) existing at the grain boundary and gallium (Ga) existing at the grain is within the above range, sintering mismatch between the dielectric layer and the internal electrode layer may be alleviated, electrode breakage may be minimized, and thus, internal electrode connectivity may be improved.

The average thickness (average length in the T-axis direction) of the dielectric layer 111 may be 2.0 μm to 8.0 μm, for example, 2.4 μm to 7.8 μm. When the average thickness of the dielectric layer 111 is within the above range, the reliability of the multilayer ceramic capacitor is excellent.

The average thickness of the dielectric layer 111 may be measured by placing the multilayer ceramic capacitor 100 in an epoxy mixture, curing it, polishing it, and then ion milling it for analysis by the SEM.

The SEM may be used, for example, a Verios G4 product from Thermofisher Scientific. The measurement conditions are 10 kV, 0.2 nA, and the analysis magnification may be 100 times. The SEM may be used to measure to produce at least one layer, 3 layers or more, 5 layers or more, or 10 layers or more of the dielectric layer 111. In the SEM image, it may be an arithmetic average of the thickness of the dielectric layer 111 at 10 points spaced at predetermined intervals from the reference point, which is the center point in the length direction (L-axis direction) or width direction (W-axis direction) of the dielectric layer 111.

The intervals of the 10 points may be adjusted depending on the scale of the SEM image, and may be, for example, 1 μm to 100 μm, 1 μm to 50 μm, or 1 μm to 10 μm. At this time, all 10 points must be positioned within the dielectric layer 111, and if all 10 points are not positioned within the dielectric layer 111, the position of the reference point may be changed, or the interval between the 10 points may be adjusted.

The first internal electrode 121 and the second internal electrode 122 are electrodes having different polarities, which are alternately arranged opposite each other along the T-axis direction with the dielectric layer 111 interposed therebetween, and one end of the first internal electrode 121 and the second internal electrode 122 may be exposed through the third and fourth surfaces of the capacitor body 110, respectively.

The first internal electrode 121 and the second internal electrode 122 may be electrically insulated from each other by the dielectric layer 111 disposed in the middle.

The ends of the first internal electrode 121 and the second internal electrode 122, which are alternately exposed through the third and fourth surfaces of the capacitor body 110, may be connected and electrically connected with the first external electrode 131 and the second external electrode 132, respectively.

The first internal electrode 121 and the second internal electrode 122 may include a conductive metal, for example, a metal such as Ni, Cu, Ag, Pd, Au, or an alloy thereof, such as an Ag—Pd alloy.

Additionally, the first internal electrode 121 and the second internal electrode 122 may include dielectric particles of the same composition as the ceramic material included in the dielectric layer 111.

The first internal electrode 121 and the second internal electrode 122 may be formed using a conductive paste including a conductive metal. The printing method of the conductive paste may be a screen-printing method or a gravure printing method.

The average thickness of the first internal electrode 121 and the second internal electrode 122 may be 0.1 μm to 2 μm. The average thickness of the first internal electrode 121 and the second internal electrode 122 may be measured by the SEM analysis. Here, since the SEM analysis is the same as the method for measuring the average thickness of the dielectric layer 111 described above, a description thereof will be omitted.

As described above, the capacitor body 110 may be formed by sintering a stacking structure in which the plurality of dielectric layers 111 and internal electrode layers 121 and 122 are stacked. Specifically, the capacitor body 110 may be formed by sintering at a temperature of 1000° C. to 1200° C., for example, 1050° C. to 1150° C. By sintering the capacitor body 110 at a low temperature in the above temperature range, sintering mismatch between the dielectric layer 111 and the internal electrode layers 121 and 122 is alleviated, and thus electrode breakage may be minimized and internal electrode connectivity may be improved.

The multilayer ceramic capacitor 100 according to an embodiment may have an internal electrode connectivity of 80% or more to 100% or less in the active portion A, for example, 82% to 95%, or 84% to 93%. When the internal electrode connectivity in the active portion A is within the above range, the occurrence of electrode breakage is minimized, and thus a highly reliable multilayer ceramic capacitor may be secured without short circuit. Here, the active portion A is a region where the dielectric layer 111 and the internal electrode layers 121 and 122 are alternately arranged, as shown in FIG. 3 described above.

Internal electrode connectivity may be measured in the following method.

First, after the multilayer ceramic capacitor 100 is placed in an epoxy mixture and cured, the W-axis and T-axis directional surfaces (WT surfaces) of the capacitor body 110 are polished up to ½ point in the L-axis direction, fixed, and held in a vacuum atmosphere chamber, so that a cross-sectional sample may be obtained to observe the active portion where the dielectric layer 111 and the internal electrode layers 121 and 122 intersect.

Next, the active portion of the cross-sectional sample may be ion milled and measured using the SEM. The SEM may be used, for example, a Verios G4 product from Thermofisher Scientific. The measurement conditions are 10 kV, 0.2 nA, and the analysis magnification may be 100 times. The SEM may be used to measure to produce at least one layer, 3 layers or more, 5 layers or more, or 10 layers or more of the dielectric layer 111.

Accordingly, the measured internal electrode connectivity may be calculated using Equation 1 below.

$$\text{Internal electrode connectivity}(\%) = (\text{total length of connection portions excluding disconnection portions in the plurality of internal electrode layers/total length of the plurality of internal electrode layers}) \times 100 \quad \text{(Equation 1)}$$

In Equation 1, the denominator is the sum of the total lengths of all internal electrode layers existing in the active portion A, which is a value including all connection portions L and disconnection portions C. In Equation 1, the numerator is the sum of the lengths of the connection portions L excluding the disconnection portions C in the plurality of internal electrode layers. For reference, in FIG. 4, the connection portion L and the disconnection portion C are shown only in one place for convenience, and indications in other parts are omitted.

In addition, the multilayer ceramic capacitor 100 according to an embodiment may have an internal electrode connectivity 80% or more to 100% or less in the region near side margin portion B, for example, 82% to 95%, or 84% to 93%. When the internal electrode connectivity in the region near side margin portion B is within the above range, the occurrence of electrode breakage is minimized, and thus a highly reliable multilayer ceramic capacitor may be secured without short circuit.

Here, as shown in FIG. 3 above, the region near side margin portion B refers to a region starting from a boundary between the active portion A and the side margin portion 140, to a depth surface corresponding to a point 5% to 20%, for example, 8% to 15%, of the total length of the active portion A in the width direction (W-axis direction) from the boundary into the active portion A.

The method of measuring the internal electrode connectivity and the definition by Equation 1 are the same as described above.

The first external electrode 131 and the second external electrode 132 are provided with voltages of different polarities and may be electrically connected with exposed portions of the first inner electrode 121 and the second inner electrode 122, respectively.

According to the above configuration, when a predetermined voltage is applied to the first external electrode 131 and the second external electrode 132, charges are accumulated between the opposing first internal electrode 121 and the second internal electrode 122. At this time, the capacitance of the multilayer ceramic capacitor 100 is proportional to the overlapped area of the first internal electrode 121 and the second internal electrode 122, which are overlap each other along the T-axis direction in the active portion A.

The first external electrode 131 and the second external electrode 132 may each include first and second connection portions respectively disposed on the third and fourth surfaces of the capacitor body 110 to connect with the first inner electrode 121 and the second inner electrode 122, and first and second band portions disposed at the corners where the third or fourth surface meets the fifth or sixth surface of the capacitor body 110.

The first and second band portions may extend from the first and second connection portions to parts of the first and second surfaces or the fifth and sixth surfaces of the capacitor body 110, respectively. The first and second band portions may serve to improve the adhesion strength of the first external electrode 131 and the second external electrode 132.

The first external electrode 131 and the second external electrode 132 may each include a sintered metal layer in contact with the capacitor body 110, a conductive resin layer disposed to cover the sintered metal layer, and a plating layer disposed to cover the conductive resin layer.

The sintered metal layer may include conductive metal and glass.

The conductive metal may include copper (Cu), nickel (Ni), silver (Ag), palladium (Pd), gold (Au), platinum (Pt), tin (Sn), tungsten (W), titanium (Ti), lead (Pb), and an alloy thereof, or a combination thereof. For example, copper (Cu) may include a copper (Cu) alloy. When the conductive metal includes copper, metals other than copper may be included in an amount of 5 parts by mole or less based on 100 parts by mole of copper.

The glass may include a composition of mixed oxides, for example, one or more selected from the group consisting of silicon oxide, boron oxide, aluminum oxide, transition metal oxide, alkali metal oxide, and alkaline earth metal oxide. The transition metal is selected from the group consisting of zinc (Zn), titanium (Ti), copper (Cu), vanadium (V), manganese (Mn), iron (Fe), and nickel (Ni), the alkali metal may be selected from the group consisting of lithium (Li), sodium (Na), and potassium (K), and the alkaline earth metal may be one or more selected from the group consisting of magnesium (Mg), calcium (Ca), strontium (Sr), and barium (Ba).

Optionally, the conductive resin layer is formed on the sintered metal layer, for example, may be formed to completely cover the sintered metal layer. Meanwhile, the first external electrode 131 and the second external electrode 132 may not include a sintered metal layer. In this case, the conductive resin layer may be in direct contact with the capacitor body 110.

The conductive resin layer extends to the first and second surfaces or the fifth and sixth surfaces of the capacitor body 110, and the length of the region (i.e., band portion) where the conductive resin layer is extended and disposed to the first and second surfaces or the fifth and sixth surfaces of the capacitor body 110 may be longer than the length of the region (i.e., band portion) where the sintered metal layer is extended and disposed to the first and second surfaces or the fifth and sixth surfaces of the capacitor body 110.

In other words, the conductive resin layer is formed on the sintered metal layer and may be formed to completely cover the sintered metal layer.

The conductive resin layer includes resin and conductive metal.

The resin included in the conductive resin layer may be implemented by a material which has adhesive properties and shock absorption properties and is able to form a paste when mixed with the conductive metal powder, but is not limited thereto. For example, the resin may include phenolic resin, acrylic resin, silicone resin, epoxy resin, or polyimide resin.

The conductive metal included in the conductive resin layer serves to electrically connect the first internal electrode 121 and the second internal electrode 122 or the sintered metal layer.

The conductive metal included in the conductive resin layer may have a spherical shape, a flake shape, or a combination thereof. That is, the conductive metal may be formed only in flake form, only in spherical form, or in a mixed form of flake form and spherical form.

Here, the spherical shape may also include a shape that is not a perfect spherical shape, for example, a shape in which the length ratio of the major axis and the minor axis (major axis/minor axis) is 1.45 or less. Flake shape powder refers to a powder with a flat and elongated shape, and is not particularly limited. But for example, the length ratio of the major axis and the minor axis (major axis/minor axis) may be 1.95 or more.

The first external electrode 131 and the second external electrode 132 may further include a plating layer disposed outside the conductive resin layer.

The plating layer may include nickel (Ni), copper (Cu), tin (Sn), palladium (Pd), platinum (Pt), gold (Au), silver (Ag), tungsten (W), titanium (Ti), or lead (Pb), either alone or in an alloy thereof. For example, the plating layer may be a nickel (Ni) plating layer or a tin (Sn) plating layer, may be a form in which the nickel (Ni) plating layer and the tin (Sn) plating layer are sequentially stacked, or may be a form in which the tin (Sn) plating layer, the nickel (Ni) plating layer, and the tin (Sn) plating layer are sequentially stacked.

Additionally, the plating layer may include a plurality of nickel (Ni) plating layers and/or a plurality of tin (Sn) plating layers.

The plating layer may improve mountability to the substrate, structural reliability, durability to the outside, heat resistance, and equivalent series resistance (ESR) of the multilayer capacitor 100.

Hereinafter, a method of preparing the multilayer ceramic capacitor 100 according to an embodiment will be described.

A method of preparing the multilayer ceramic capacitor 100 according to an embodiment may include: preparing a dielectric slurry by mixing barium titanate-based main ingredient powder and gallium (Ga) complex; preparing a dielectric green sheet using the dielectric slurry and forming a conductive paste layer on the surface of the dielectric green sheet; preparing a dielectric green sheet stacking structure by stacking the dielectric green sheet on which the conductive paste layer is formed; preparing a capacitor body including a dielectric layer and an internal electrode layer by sintering the dielectric green sheet stacking structure; and forming an external electrode on one surface of the capacitor body.

The dielectric slurry may be produced by mixing barium titanate-based main ingredient powder and gallium (Ga) complex.

The gallium (Ga) complex is a compound in which gallium (Ga) is dispersed in a polycarboxylic acid-based compound and has an ionic form, and may include gallium carboxylate in ionic form.

The gallium (Ga) complex may be mixed in an amount of 0.01 parts by mole to 10 parts by mole based on 100 parts by mole of barium titanate-based main ingredient powder, for example, 0.05 parts by mole to 8 parts by mole, or 0.1 parts by mole to 5 parts by mole.

When the gallium (Ga) complex is mixed within the above content range, gallium (Ga) is stably added to the barium titanate, which corresponds to the dielectric base material, enabling uniform distribution of atoms, thereby increasing the low-temperature sintering effect of the dielectric layer. Accordingly, by alleviating the sintering mismatch between the dielectric layer and the internal electrode layer, electrode breakage may be minimized and internal electrode connectivity may be improved.

Dielectric slurry may be prepared by additionally mixing accessory ingredient powder. The accessory ingredient powder may be used in the form of a sol dispersed in an organic solvent.

The accessory ingredient powder may include aluminum oxide ($Al_2O_3$), silicon dioxide ($SiO_2$), magnesium oxide (MgO), vanadium oxide ($V_2O_5$), manganese oxide ($MnO_2$), or a combination thereof. The accessory ingredient powder may be used in the form of a sol dispersed in an organic solvent.

Aluminum oxide ($Al_2O_3$) may be mixed in an amount of 0.01 parts by mole to 5 parts by mole based on 100 parts by mole of barium titanate-based main ingredient powder, silicon dioxide ($SiO_2$) may be mixed in an amount of 0.01 parts by mole to 5 parts by mole based on 100 parts by mole of barium titanate-based main ingredient powder, magnesium oxide (MgO) may be mixed in an amount of 0.01 parts by mole to 5 parts by mole based on 100 parts by mole of the barium titanate-based main ingredient powder, vanadium oxide ($V_2O_5$) may be mixed in an amount of 0.01 parts by mole to 5 parts by mole based on 100 parts by mole of the barium titanate-based main ingredient powder, and manganese oxide ($MnO_2$) may be mixed in an amount of 0.01 parts by mole to 5 parts by mole based on 100 parts by mole of barium titanate-based main ingredient powder. When the accessory ingredient powder is mixed within the above content range, it is easy to form a second phase with gallium (Ga), and accordingly, the low-temperature sintering effect of the dielectric layer may be increased.

Additionally, the dielectric slurry may be prepared by additionally mixing additives such as dispersants, binders, plasticizers, lubricants, and antistatic agents, and solvents.

The dispersant may include, for example, a phosphoric acid ester-based dispersant, a polycarboxylic acid-based dispersant, or a combination thereof. The dispersant may be mixed in an amount of 0.1 to 5 parts by weight, based on 100 parts by weight of the total amount of barium titanate and gallium (Ga) complex, for example, 0.3 to 3 parts by weight. When the dispersant is mixed within the above content range, the dispersibility of the dielectric slurry is excellent, and the amount of impurities contained in the prepared dielectric layer may be reduced.

The binder may be, for example, an acrylic resin, polyvinyl butyral resin, polyvinyl acetal resin, or ethylcellulose resin, and the like. The binder may be added in an amount of 0.1 to 50 parts by weight based on 100 parts by weight of the total amount of barium titanate and gallium (Ga) complex, for example, 3 to 30 parts by weight. When the binder is mixed within the above content range, the dispersibility of the dielectric slurry is excellent, and the amount of impurities contained in the prepared dielectric layer may be reduced.

The plasticizer may include, for example, phthalic acid-based compounds such as dioctyl phthalate, benzylbutyl phthalate, dibutyl phthalate, dihexyl phthalate, di(2-ethylhexyl) phthalate, and di(2-ethylbutyl) phthalate; adipic acid-based compounds such as dihexyl adipate and di(2-ethylhexyl) adipate; glycol-based compounds such as ethylene glycol, diethylene glycol, and triethylene glycol; and glycol ester-based compounds such as triethylene glycol dibutyrate, triethylene glycol di(2-ethylbutyrate), and triethylene glycol di(2-ethylhexanoate). The plasticizer may be added in an amount of 0.1 to 20 parts by weight based on 100 parts by weight of the total amount of barium titanate and gallium (Ga) complex, for example, 1 to 10 parts by weight. When the plasticizer is mixed within the above content range, the dispersibility of the dielectric slurry is excellent, and the amount of impurities contained in the prepared dielectric layer may be reduced.

The solvent may be an aqueous solvent such as water; alcohol-based solvents such as ethanol, methanol, benzyl alcohol, and methoxyethanol; glycol-based solvents such as ethylene glycol and diethylene glycol; ketone-based solvents such as acetone, methyl ethyl ketone, methyl isobutyl ketone, and cyclohexanone; ester solvents such as butyl acetate, ethyl acetate, carbitol acetate, and butylcarbitol acetate; ether-based solvents such as methyl cellosolve, ethyl cellosolve, butyl ether, and tetrahydrofuran; and aromatic solvents such as benzene, toluene, or xylene. The solvent, for example, may be selected considering the solubility or dispersibility of various additives included in the dielectric slurry, and an alcohol-based solvent or an aromatic solvent may be used.

The solvent may be mixed in an amount of 50 to 1000 parts by weight based on 100 parts by weight of the total amount of the barium titanate and gallium (Ga) complex, for example, 100 to 500 parts by weight. When the solvent is mixed within the above content range, the dielectric slurry components may be sufficiently mixed, and subsequent removal of the solvent is easy.

Mixing of the barium titanate major component powder, gallium (Ga) complex, and optionally accessory ingredient powder may be used with a wet ball mill or stirred mill.

When using zirconia balls in a wet ball mill, a plurality of zirconia balls with a diameter of 0.1 mm to 10 mm may be used for wet mixing for 8 hours to 48 hours, or 10 hours to 24 hours.

The prepared dielectric slurry is formed into a dielectric layer after sintering.

As a method of molding the prepared dielectric slurry into a sheet shape, a tape molding method such as a doctor blade method, a calender roll method, etc. may be used, for example, an on-roll molding coater with a head discharge method, and a dielectric green sheet may be obtained by drying the molded body afterward.

To form a conductive paste layer that becomes the internal electrode layer after sintering, a conductive paste may be prepared by mixing a conductive powder made of a conductive metal or an alloy thereof, a binder, and a solvent. Additionally, barium titanate powder may be mixed together as a co-material if necessary. The co-material may act to suppress sintering of the conductive powder during the sintering process. A conductive paste layer is formed by applying a conductive paste to the surface of the dielectric green sheet in a predetermined pattern using various printing methods such as screen-printing or transfer methods.

Next, a dielectric green sheet stacking structure is prepared by stacking a plurality of layers of dielectric green sheets on which internal electrode patterns are formed, and then pressing the plurality of layers of dielectric green sheets in the stacking direction. At this time, the dielectric green sheet and the internal electrode pattern may be stacked so that the dielectric green sheet is positioned on the upper and lower surfaces of the dielectric green sheet stacking structure in the stacking direction.

The step of cutting the prepared dielectric green sheet stacking structure to a predetermined size by dicing or the like may optionally be performed.

Additionally, the dielectric green sheet stacking structure may be solidified and dried to remove plasticizers, etc., if necessary, and after solidified and dried, the dielectric green sheet stacking structure may be barrel polished using a horizontal centrifugal barrel machine, and the like. In barrel polishing, the dielectric green sheet stacking structure is placed into a barrel container with media and polishing liquid, and rotational motion or vibration is applied to the barrel container, thus unnecessary parts, such as burrs generated during cutting, may be polished.

Additionally, after barrel polishing, the dielectric green sheet stacking structure may be washed with a cleaning solution such as water, and dried.

Subsequently, the capacitor body may be prepared after binder removal treatment and sintering of the dielectric green sheet stacking structure.

The conditions for binder removal may be appropriately adjusted depending on the components of the dielectric layer or the internal electrode layer.

For example, the rate of temperature rise during binder removal treatment may be 5° C./hour to 300° C./hour, the support temperature may be 180° C. to 400° C., and the temperature holding time may be 0.5 hour to 24 hours. The treatment atmosphere of the binder removal may be the air or a reducing atmosphere.

Sintering of the dielectric green sheet stacking structure may be performed at a temperature of 1000° C. to 1200° C., for example, 1050° C. to 1150° C. When sintering is performed at a temperature within the above range, sintering mismatch between the dielectric layer and the internal electrode layer is alleviated, and thus electrode breakage mat be minimized, thereby improving internal electrode connectivity.

Additionally, sintering may be performed for 0.5 to 8 hours, for example, 1 to 3 hours. Additionally, sintering may be performed in a reducing atmosphere, for example, in a humidified mixed gas of nitrogen and hydrogen. When the internal electrode includes nickel (Ni) or a nickel (Ni) alloy, the oxygen partial pressure in the sintering atmosphere may be $1.0 \times 10^{-14}$ MPa to $1.0 \times 10^{-10}$ MPa.

After sintering, annealing may be performed as needed. Annealing is a treatment to reoxidize the dielectric layer, and annealing may be performed if sintering is performed in a reducing atmosphere. The conditions of the annealing treatment may also be appropriately adjusted depending on the components of the dielectric layer. For example, the annealing temperature may be 950° C. to 1150° C., the time may be 1 minute to 20 hours, and the rate of temperature rise may be 50° C./hour to 500° C./hour. The annealing atmosphere may be a humidified nitrogen gas ($N_2$) atmosphere, and the oxygen partial pressure may be $1.0 \times 10^{-9}$ MPa to $1.0 \times 10^{-5}$ MPa.

In binder removal treatment, sintering treatment, or annealing treatment, for example, a wetter may be used to humidify nitrogen gas or mixed gas. In this case, the water temperature may be 5° C. to 75° C. The binder removal treatment, sintering treatment, and annealing treatment may be performed sequentially or independently.

Optionally, surface treatment such as sand blasting, laser irradiation, barrel polishing, etc. may be performed on the third and fourth surfaces of the prepare capacitor body 110. By performing this surface treatment, the ends of the first internal electrode and the second internal electrode may be exposed to the outermost surfaces of the third and fourth surfaces, and thus the electrical connection between the first external electrode and the second external electrode, and the first internal electrode and the second internal electrode may be improved, alloy portions may be easily formed.

Next, an external electrode is formed on one surface of the prepared capacitor body 110.

For example, a paste for forming sintered metal layer forming paste may be applied to an external electrode and then sintered to form a sintered metal layer.

The paste for forming the sintered metal layer may include a conductive metal and glass. Since the description of the conductive metal and glass is the same as described above, repetitive description will be omitted. Additionally, the paste for forming the sintered metal layer may optionally include a binder, solvent, dispersant, plasticizer, oxide powder, and the like. The binder may be, for example, ethylcellulose, acrylic, butyral, etc., and the solvent may be, for example, an organic solvent or aqueous solvent such as terpineol, butylcarbitol, alcohol, methyl ethyl ketone, acetone, toluene, and the like.

Methods for applying the paste for forming the sintered metal layer on the outer surface of the capacitor body 110 may include various printing methods such as dip method and screen-printing, application method using a dispenser, etc., and spraying method using spray. The paste for forming the sintered metal layer may be applied to at least the third and fourth surfaces of the capacitor body 110, and optionally applied to a part of the first, second, fifth, or sixth surfaces on which the band portions of the first and second external electrodes are formed.

Thereafter, the capacitor body 110 onto which the paste for forming the sintered metal layer is applied is dried and sintered at a temperature of 700° C. to 1000° C. for 0.1 to 3 hours to form the sintered metal layer.

Optionally, a paste for forming a conductive resin layer may be applied to the outer surface of the obtained capacitor body 110 and then cured to form a conductive resin layer.

The paste for forming the conductive resin layer may include a resin and, optionally, a conductive metal or a non-conductive filler. Since the description of the conductive metal and resin is the same as described above, repetitive description will be omitted. Additionally, the paste for forming the conductive resin layer may optionally include a binder, solvent, dispersant, plasticizer, oxide powder, and the like. The binder may be, for example, ethylcellulose, acrylic, butyral, etc., and the solvent may be an organic solvent or aqueous solvent such as terpineol, butylcarbitol, alcohol, methyl ethyl ketone, acetone, and toluene.

For example, the method of forming the conductive resin layer may be formed by dipping the capacitor body 110 in a paste for forming the conductive resin layer and then curing it, or by printing the paste for forming the conductive resin layer on the surface of the capacitor body 110 by a screen-printing method or a gravure printing method, or by applying the paste for forming the conductive resin layer to the surface of the capacitor body 110 and then curing it.

Next, a plating layer is formed on the outside of the conductive resin layer.

For example, the plating layer may be formed by a plating method, sputtering, or electrolytic plating (electric deposition).

The above-described embodiments will be described in more detail through examples below. However, the following examples are for illustrative purposes only and do not limit the scope of appended claims.

Preparing of Multilayer Ceramic Capacitor

Examples 1 to 3 and Comparative Examples 1 and 2

The dielectric slurry was prepared by mixing barium titanate ($BaTiO_3$) powder, gallium raw material, and accessory ingredient powder of aluminum oxide ($Al_2O_3$), silicon dioxide ($SiO_2$), magnesium oxide (MgO), vanadium oxide ($V_2O_5$), and manganese oxide ($MnO_2$) in the composition shown in Table 1 below. At this time, in Examples 1 to 3, ionic gallium carboxylate (Ga—COO) in ionic form was used as the gallium raw material, in Comparative Example 1, gallium oxide ($Ga_2O_3$) was used, and in Comparative Example 2, gallium raw material was not used. Mixing was performed by using zirconium balls ($ZrO_2$ balls) as a dispersion medium, adding ethanol/toluene and polyvinyl butyral (PVB) resin as a wetting dispersant and binder, and then mechanically milling.

The prepared dielectric slurry was used to prepare the dielectric green sheet using the on-roll molding coater.

A conductive paste layer containing nickel (Ni) was printed on the surface of the dielectric green sheet, and the dielectric green sheet (width×length×height=3.2 mm×2.5 mm×2.5 mm) with the conductive paste layer formed was stacked and pressed to prepare a dielectric green sheet stacking structure.

The genetic green sheet stack was sintered under conditions of 400° C. or lower, in a nitrogen atmosphere through a plasticizing process, and at a sintering temperature of 1300° C. or lower, with a hydrogen concentration of 1.0% $H_2$ or less.

Next, a multilayer ceramic capacitor was prepared through processes such as external electrodes and plating.

TABLE 1

The unit is the part by mole represented based on 100 parts by mole of $BaTiO_3$.

| | $BaTiO_3$ | Ga raw material | $Al_2O_3$ | $SiO_2$ | MgO | $V_2O_5$ | $MnO_2$ |
|---|---|---|---|---|---|---|---|
| Example 1 | 100 | 0.3 | 0.3 | 2.5 | 1.0 | 0.1 | 0.1 |
| Example 2 | 100 | 0.6 | 0.3 | 2.5 | 1.0 | 0.1 | 0.1 |
| Example 3 | 100 | 0.9 | 0.3 | 2.5 | 1.0 | 0.1 | 0.1 |
| Comparative Example 1 | 100 | 0.3 | 0.3 | 2.5 | 1.0 | 0.1 | 0.1 |
| Comparative Example 2 | 100 | 0 | 0.3 | 2.5 | 1.0 | 0.1 | 0.1 |

Evaluation 1: TEM-EDS Analysis

TEM-EDS (transmission electron microscopy-energy dispersive spectroscopy) analysis was performed on the multilayer ceramic capacitors prepared in Example 1 and Comparative Example 1, and the peak intensities for each element detected and the peak intensity ratios between the two elements are shown in Tables 2 and 3 below.

The case of Example 1 is shown in Table 2 below, and the case of Comparative Example 1 is shown in Table 3 below.

TEM-EDS analysis was performed as follows. After the multilayer ceramic capacitors prepared in Example 1 and Comparative Example 1 were placed in an epoxy mixture and cured, the W-axis and T-axis directional surfaces (WT surfaces) of the capacitor body 110 were polished up to ½ point in the L-axis direction, fixed, and held in a vacuum atmosphere chamber, so that a cross-sectional sample was obtained to observe the active portion where the dielectric layer and the internal electrode layer intersect. The center portion of the active portion of the cross-sectional sample was measured by TEM. TEM was performed using the Xe—FIB (focused ion beam) under the conditions of an acceleration voltage of 200 kV and an analysis magnification of 110 k times, and measurements were made to produce at least 5 dielectric layers and internal electrode layers. In the TEM image of the measured cross-sectional sample, EDS analysis was performed on the region near interface R, which starts from the interface between the dielectric layer and the internal electrode layer, and extending from the interface to a depth surface of 100 nm from the interface into the dielectric layer, to measure the peak intensity ratio between elements. The peak intensity ratio between elements was measured in the region near interface R at two points in the active portion, and the average value of the peak intensity ratio between elements at each point was obtained.

Figure 5:
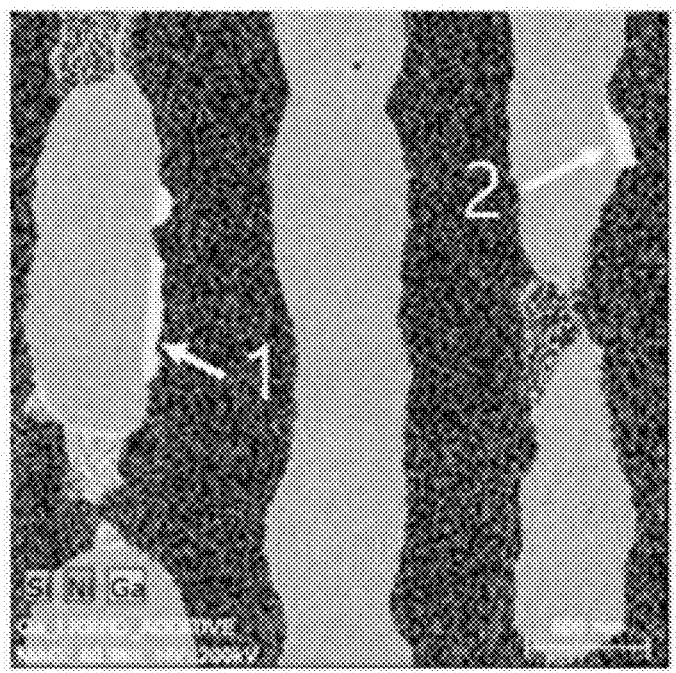
FIG. 5 is a TEM-EDS analysis image of the multilayer ceramic capacitor according to Example 1.
Figure 6:
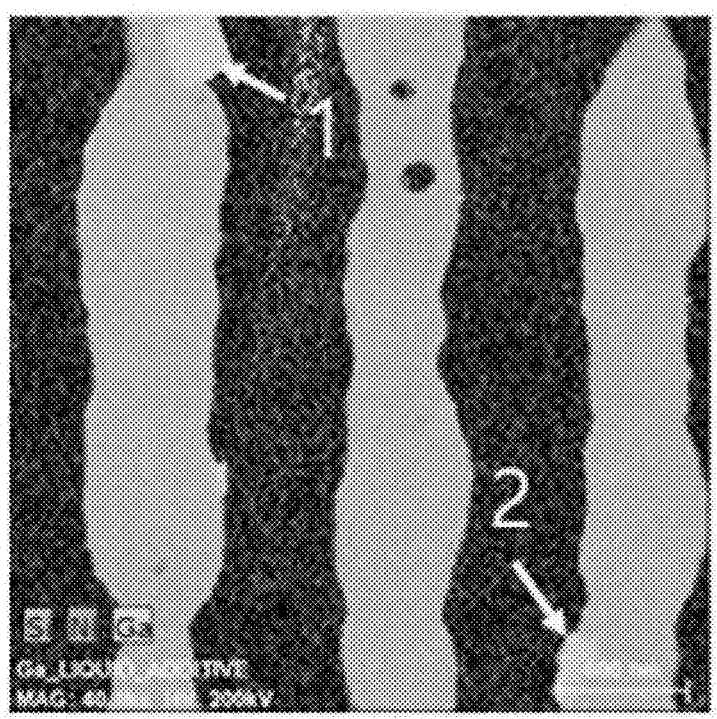
FIG. 6 is a TEM-EDS analysis image of the multilayer ceramic capacitor according to Comparative Example 1.

The peak intensity of each element and the peak intensity ratio between the two elements shown in Tables 2 and 3 below are the average values measured at the two points shown in FIGS. 5 and 6. FIG. 5 is a TEM-EDS analysis image of the multilayer ceramic capacitor according to Example 1, and FIG. 6 is a TEM-EDS analysis image of the multilayer ceramic capacitor according to Comparative Example 1.

In Tables 2 and 3 below, E1 is the peak intensity value of each element at point 1, and E2 is the peak intensity value of each element at point 2. After calculating each peak intensity value, the ratio was obtained by setting the peak intensity of Ga as the denominator. The average represents the average value of the E1/Ga ratio and E2/Ga ratio.

TABLE 2

| Element | O | Mg | Al | Si | Ti | V | Mn | Ga | Ba | Total |
|---|---|---|---|---|---|---|---|---|---|---|
| E1 | 54.9 | 3.8 | 8.8 | 11.3 | 8.1 | 0.3 | 0.4 | 5.4 | 7 | 100 |
| E2 | 51.1 | 3.2 | 8.3 | 12.3 | 9 | 0.4 | 0.5 | 6.8 | 8.4 | 100 |
| E1/Ga | 10.15 | 0.70 | 1.63 | 2.09 | 1.50 | 0.06 | 0.07 | 1.00 | 1.30 | — |
| E2/Ga | 7.53 | 0.47 | 1.22 | 1.81 | 1.32 | 0.06 | 0.07 | 1.00 | 1.24 | — |
| average | 8.84 | 0.59 | 1.43 | 1.95 | 1.41 | 0.06 | 0.07 | 1.00 | 1.27 | — |

TABLE 3

| Element | O | Mg | Al | Si | Ti | V | Mn | Ga | Ba | Total |
|---|---|---|---|---|---|---|---|---|---|---|
| E1 | 60.0 | 4.4 | 2.8 | 0.8 | 4.6 | 0.1 | 1.1 | 25.6 | 0.6 | 100 |
| E2 | 61.0 | 2.8 | 3.2 | 0.3 | 5.6 | 0.6 | 1.2 | 18.2 | 7.2 | 100 |
| E1/Ga | 2.34 | 0.17 | 0.11 | 0.03 | 0.18 | 0.00 | 0.04 | 1.00 | 0.02 | |
| E2/Ga | 3.35 | 0.15 | 0.18 | 0.02 | 0.31 | 0.03 | 0.06 | 1.00 | 0.40 | |
| average | 2.85 | 0.16 | 0.14 | 0.02 | 0.24 | 0.02 | 0.05 | 1.00 | 0.21 | |

Referring to Tables 2 and 3, it can be seen that in the case of Example 1 applying gallium complex according to an embodiment, the peak intensity ratio of Ba/Ga ($I_{Ba}/I_{Ga}$) was within the range of 1.0 to 5.0, whereas in the case of Comparative Example 1 applying Ga in the form of a metal oxide, the peak intensity ratio of Ba/Ga ($I_{Ba}/I_{Ga}$) is shown to be 0.21.

In addition, in the case of Comparative Example 1 where Ga in the form of a metal oxide was applied, the peak intensity of Ga was large in the region positioned near the interface between the dielectric layer and the internal electrode layer, i.e., in the region near interface R, which suggests the possibility that Ga exists locally or alone. On the other hand, referring to Table 2, in Example 1 where the gallium complex is applied, the peak intensity of Ga is relatively low in the region near interface R, which means that Ga forms a glass phase, which is a second phase, with the elements such as Mg, Al, Si, etc., and is uniformly distributed in the glass phase. The formation of a glass phase can be seen by the fact that the peak intensity ratio of Al/Ga and the peak intensity ratio of Si/Ga are 1 or more.

Evaluation 2: STEM-EDS Analysis

Figure 7:
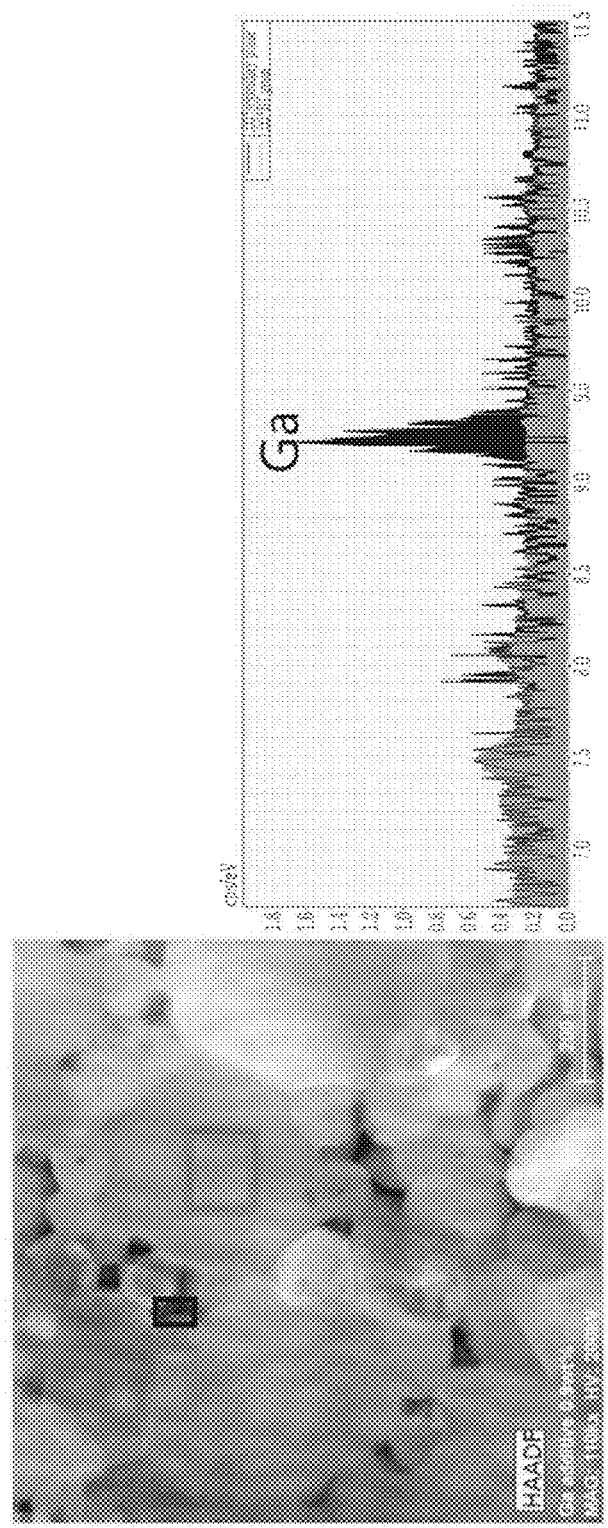
FIG. 7 shows the results of STEM-EDS mapping analysis of the active portion of the multilayer ceramic capacitor according to Example 3.

A scanning transmission electron microscope-energy dispersive spectroscopy (STEM-EDS) mapping analysis was performed on the active portion of the multilayer ceramic capacitor prepared in Example 3, and the results are shown in FIG. 7.

The STEM-EDS analysis was measured in the following method. After obtaining a cross-sectional sample from the multilayer ceramic capacitor prepared in Example 3 using the same method as in Evaluation 1, the center portion of the active portion of the cross-sectional sample was measured using a STEM. STEM was performed using the Xe—FIB (focused ion beam) under the conditions of an acceleration voltage of 200 kV and an analysis magnification of 110 k times. In the STEM image of the measured cross-sectional sample, EDS analysis was performed on the region near interface R, which is the region starting from the interface between the dielectric layer and the inner electrode layer, and extending from the interface to a depth surface of 100 nm into the dielectric layer.

FIG. 7 shows the results of STEM-EDS mapping analysis of the active portion of the multilayer ceramic capacitor according to Example 3.

Referring to FIG. 7, it can be seen that Ga is uniformly distributed throughout the active portion of the multilayer ceramic capacitor according to an embodiment, Ga is distributed relatively more than the grains at the grain boundary, and also exists in the form of a glass second phase at the grain boundary.

Evaluation 3: Internal Electrode Connectivity

SEM (scanning electron microscopy) analysis was performed on the multilayer ceramic capacitors prepared in Examples 1 and 2 and Comparative Example 2 to evaluate internal electrode connectivity, and the results are shown in FIGS. 8 and 9.

FIG. 8 is an SEM image of the active portion of the multilayer ceramic capacitor according to Examples 1 and 2 and Comparative Example 2, and FIG. 9 is an SEM image of the region nearside margin portion of the multilayer ceramic capacitor according to Examples 1 and 2 and Comparative Example 2.

Specifically, with reference to FIG. 8, a cross-sectional sample was obtained from the multilayer ceramic capacitors prepared in Examples 1 and 2 and Comparative Example 2 in the same method as in Evaluation 1, and then SEM analysis was performed by ion milling on the active portion A of the cross-sectional sample, from which the internal electrode connectivity was measured. SEM analysis was performed using the Verios G4 product from Thermofisher Scientific, with measurement conditions of 10 kV, 0.2 nA. The analysis magnification was 100 times, and the measurement was performed to produce about 20 dielectric layers.

In addition, with reference to FIG. 9, SEM analysis was performed on the region near side margin portion B of the cross-sectional sample obtained above, from which the internal electrode connectivity was measured. At this time, the region near side margin portion B represents the region from the boundary between the active portion and the side margin portion to the depth surface corresponding to 10% of the total length in the width direction of the active portion into the active portion.

The internal electrode connectivity was calculated by Equation 1 below.

Internal electrode connectivity (%) = (Equation 1)

(total length of connection portions excluding disconnection

-continued portions in the plurality of internal electrode layers/total length of the plurality of internal electrode layers)×100

Referring to FIGS. 8 and 9, it can be seen that for Examples 1 and 2, where gallium (Ga) is included in the dielectric layer and the peak intensity ratio of Ba/Ga ($I_{Ba}/I_{Ga}$) in the TEM-EDS analysis of the region near interface is within the range of 1.0 to 5.0, the internal electrode connectivity is excellent in both the active portion and the region near side margin portion, compared to the case of Comparative Example 2, where gallium (Ga) is not included in the dielectric layer.

Evaluation 4: Low-Temperature Sintering Effect

Figure 10:
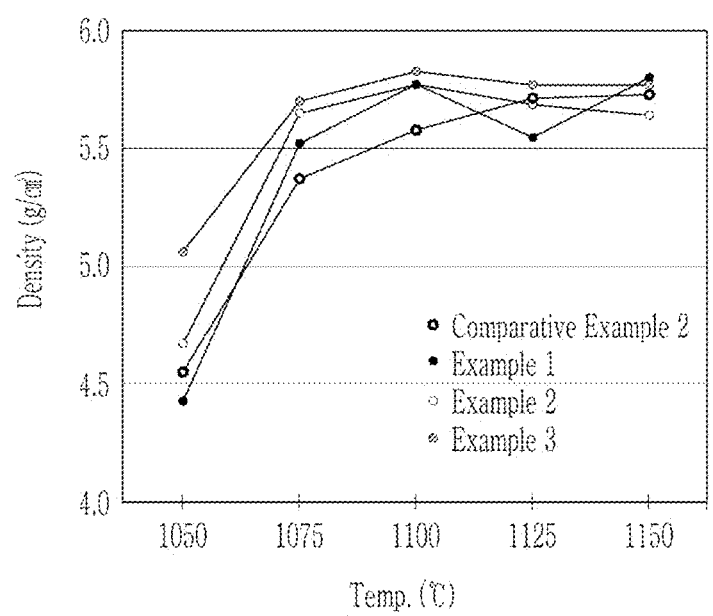
FIG. 10 is a graph showing the density change according to the sintering temperature of the dielectric layer according to Examples 1 to 3 and Comparative Example 2.

FIG. 10 is a graph showing the density change according to the sintering temperature of the dielectric layer according to Examples 1 to 3 and Comparative Example 2.

Referring to FIG. 10, it can be seen that for Examples 1 to 3, the sintering temperature to reach the target density value of 5.8 g/cm³ is about 1100° C., while for Comparative Example 2, the target density value is not reached even when the sintering temperature exceeds 1150° C. In other words, it can be seen that Examples 1 to 3 showed a low-temperature sintering effect of about 50° C. or higher compared to Comparative Example 2, in reaching the target density value. Therefore, it can be seen that for Examples 1 to 3, where gallium (Ga) is included in the dielectric layer and the peak intensity ratio of Ba/Ga ($I_{Ba}/I_{Ga}$) is within the range of 1.0 to 5.0 in the TEM-EDS analysis of the region near interface, the low-temperature sintering effect of the dielectric layer is excellent compared to Comparative Example 2, in which gallium (Ga) is not included in the dielectric layer.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A multilayer ceramic capacitor, comprising:
a capacitor body including a dielectric layer and an internal electrode layer; and
an external electrode disposed outside the capacitor body,
wherein the dielectric layer includes barium titanate-based main ingredient including barium (Ba) and titanium (Ti), and gallium (Ga), and
peak intensity ratio of Ba/Ga ($I_{Ba}/I_{Ga}$), obtained by TEM-EDS analysis of a region from an interface between the dielectric layer and the internal electrode layer to a depth surface of 10 nm to 500 nm into the dielectric layer, is 1.0 to 5.0.

2. The multilayer ceramic capacitor of claim 1, wherein: peak intensity ratio of Ti/Ga ($I_{Ti}/I_{Ga}$), obtained by the TEM-EDS analysis of the region, is 1.0 to 5.0.

3. The multilayer ceramic capacitor of claim 1, wherein: the dielectric layer further comprises an accessory ingredient, and
the accessory ingredient comprises aluminum (Al), silicon (Si), magnesium (Mg), vanadium (V), manganese (Mn), or a combination thereof.

4. The multilayer ceramic capacitor of claim 3, wherein: the accessory ingredient includes the aluminum (Al), and peak intensity ratio of Al/Ga ($I_{Al}/I_{Ga}$), obtained by the TEM-EDS analysis of the region, is 1.0 to 5.0.

5. The multilayer ceramic capacitor of claim 3, wherein: the accessory ingredient includes the silicon (Si), and peak intensity ratio of Si/Ga ($I_{Si}/I_{Ga}$), obtained by the TEM-EDS analysis of the region, is 1.0 to 5.0.

6. The multilayer ceramic capacitor of claim 3, wherein: the accessory ingredient includes the magnesium (Mg), and
peak intensity ratio of Mg/Ga ($I_{Mg}/I_{Ga}$), obtained by the TEM-EDS analysis of the region, is 0.4 to 2.0.

7. The multilayer ceramic capacitor of claim 3, wherein: the gallium (Ga) exists as a second phase in combination with the accessory ingredient.

8. The multilayer ceramic capacitor of claim 1, wherein: the gallium (Ga) is included in an amount of 0.01 parts by mole to 10 parts by mole based on 100 parts by mole of the barium titanate-based main ingredient.

9. The multilayer ceramic capacitor of claim 1, wherein: the dielectric layer includes a plurality of grains and a grain boundary positioned between the adjacent grains, and
the gallium (Ga) exists at the grain boundary.

10. The multilayer ceramic capacitor of claim 9, wherein: the molar ratio of gallium (Ga) existing in the grain boundary and gallium (Ga) existing in the grain is 5:1 to 50:1.

11. The multilayer ceramic capacitor of claim 1, wherein: the gallium (Ga) is formed from a gallium (Ga) complex.

12. The multilayer ceramic capacitor of claim 1, wherein: the capacitor body is formed by sintering at a temperature of 1000° C. to 1200° C.

13. The multilayer ceramic capacitor of claim 1, wherein: the capacitor body has an active portion in which the dielectric layer and the internal electrode layer are alternately arranged,
the internal electrode connectivity defined by Equation 1 below in the active portion is 80% or more to 100% or less, Internal electrode connectivity(%)=(total length of connection portions excluding a disconnection portion in the plurality of internal electrode layers/total length of the plurality of internal electrode layers)×100 (Equation 1)

14. The multilayer ceramic capacitor of claim 13, wherein:
the capacitor body further has side margin portions disposed on both side ends of the active portion facing each other, and
the internal electrode connectivity defined by Equation 1 in a region near side margin portion, which is defined as a region from a boundary of the active portion and the side margin portion to a depth surface corresponding to a point of 5% to 20% of the total length of the active portion into the active portion, is 80% or more to 100% or less.

15. A method of manufacturing a multilayer ceramic capacitor, comprising:
preparing a dielectric slurry by mixing barium titanate-based main ingredient powder and gallium (Ga) complex;
preparing a dielectric green sheet using the dielectric slurry and forming a conductive paste layer on the surface of the dielectric green sheet;
preparing a dielectric green sheet stacking structure by stacking the dielectric green sheet on which the conductive paste layer is formed;

preparing a capacitor body including a dielectric layer and an internal electrode layer by sintering the dielectric green sheet stacking structure; and forming an external electrode on one surface of the capacitor body, wherein the dielectric layer includes barium titanate-based main ingredient including barium (Ba) and titanium (Ti), and gallium (Ga), and peak intensity ratio of Ba/Ga ($I_{Ba}/I_{Ga}$), obtained by TEM-EDS analysis of a region from an interface between the dielectric layer and the internal electrode layer to a depth surface of 10 nm to 500 nm into the dielectric layer, is 1.0 to 5.0.

16. The method of manufacturing the multilayer ceramic capacitor of claim 15, wherein:

the gallium (Ga) complex includes gallium carboxylate in ionic form.

17. The method of manufacturing the multilayer ceramic capacitor of claim 15, wherein:

the gallium (Ga) complex is mixed in an amount of 0.01 parts by mole to 10 parts by mole based on 100 parts by mole of the barium titanate-based main ingredient powder.

18. The method of manufacturing the multilayer ceramic capacitor of claim 15, wherein:

the dielectric slurry is prepared by further mixing accessory ingredient powder including aluminum oxide ($Al_2O_3$), silicon dioxide ($SiO_2$), magnesium oxide (MgO), vanadium oxide ($V_2O_5$), manganese oxide ($MnO_2$), or a combination thereof.

19. The method of manufacturing the multilayer ceramic capacitor of claim 18, wherein:

based on 100 parts by mole of the barium titanate-based main ingredient powder, the aluminum oxide ($Al_2O_3$) is mixed in an amount of 0.01 parts by mole to 5 parts by mole, the silicon dioxide ($SiO_2$) is mixed in an amount of 0.01 parts by mole to 5 parts by mole, the magnesium oxide (MgO) is mixed in an amount of 0.01 parts by mole to 5 parts by mole, the vanadium oxide ($V_2O_5$) is mixed in an amount of 0.01 parts by mole to 5 parts by mole, and the manganese oxide ($MnO_2$) is mixed in an amount of 0.01 parts by mole to 5 parts by mole.

20. The method of manufacturing the multilayer ceramic capacitor of claim 15, wherein:

the sintering is performed at a temperature of 1000° C. to 1200° C.

* * * * *